(12) United States Patent
Manwaring et al.

(10) Patent No.: US 7,118,131 B2
(45) Date of Patent: *Oct. 10, 2006

(54) ADAPTIVE ENERGY ABSORBER

(75) Inventors: Marvin V. Manwaring, Clio, MI (US);
Richard K. Riefe, Saginaw, MI (US);
Ray G. Armstrong, Bay City, MI (US);
Lee M. Tinnin, Clio, MI (US);
Ravindra Jwalapathy, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 189 days.

This patent is subject to a terminal disclaimer.

(21) Appl. No.: 10/881,755

(22) Filed: Jun. 30, 2004

(65) Prior Publication Data
US 2005/0194777 A1   Sep. 8, 2005

Related U.S. Application Data

(63) Continuation-in-part of application No. 10/791,406, filed on Mar. 2, 2004.

(51) Int. Cl.
*B62D 1/19* (2006.01)

(52) U.S. Cl. ..................... 280/777; 188/374

(58) Field of Classification Search ............... 280/777; 188/371, 374; 74/492, 493
See application file for complete search history.

(56) References Cited

U.S. PATENT DOCUMENTS

| | | | |
|---|---|---|---|
| 5,562,307 A * | 10/1996 | Connor | 280/777 |
| 6,170,874 B1 | 1/2001 | Fosse | 280/777 |
| 6,189,929 B1 | 2/2001 | Struble et al. | 280/777 |
| 6,322,103 B1 | 11/2001 | Li et al. | 280/777 |
| 6,652,002 B1 | 11/2003 | Li et al. | 280/777 |
| 6,749,221 B1 * | 6/2004 | Li | 280/777 |
| 6,802,536 B1 * | 10/2004 | Li et al. | 280/777 |
| 6,877,775 B1 * | 4/2005 | Manwaring et al. | 280/777 |

* cited by examiner

*Primary Examiner*—Ruth Ilan
(74) *Attorney, Agent, or Firm*—Michael D. Smith

(57) ABSTRACT

An apparatus and method is provided for absorbing energy. The energy absorbing device includes an anvil movable relative to a spaced axis. The anvil defines a plurality of profiles corresponding to different rates of energy absorption. The plurality of profiles are radially adjacent to one another with respect to axis. The anvil can be moved by explosive charges. For example, the anvil can define a follower portion adjacent a first explosive charge and move in response to an explosion of the first explosive charge.

20 Claims, 12 Drawing Sheets

ADAPTIVE ENERGY ABSORBER

CROSS-REFERENCE TO RELATED APPLICATIONS

This application is a continuation-in-part of U.S. patent application Ser. No. 10/791,406, filed Mar. 2, 2004, for a THREE STAGE ROTARY STRAP EXTRUDER.

FIELD OF THE INVENTION

The invention relates to a steering column for a vehicle and, more particularly, to an energy absorbing device for a collapsible steering column.

BACKGROUND OF THE INVENTION

Steering column assemblies for vehicles can include kinetic energy absorption devices to reduce the likelihood of injury to the driver in the event of an accident. These energy absorbing devices can come in different forms. In one form, the energy absorbing device includes a metal strap that is bent and drawn over an anvil. Examples of this form of energy absorbing device include U.S. Pat. Nos. 6,170,874; 6,189,929; 6,322,103; and 6,652,002.

SUMMARY OF THE INVENTION AND ADVANTAGES

The present invention provides an energy absorbing device including an anvil having a plurality of different bending profiles radially adjacent to one another about an axis of rotation of the anvil. The different profiles correspond to different levels of energy absorption. The anvil can be rotated to position one of the plurality of profiles adjacent to the strap immediately prior to a collision to selectively set the level of energy absorption. The anvil is spaced from the axis of rotation. The invention can include a controller for controlling the rotation of the anvil. The controller can determine which profile should be positioned adjacent to the strap based on the size of the driver and/or the severity of the collision to enhance the protection of the driver of the vehicle.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
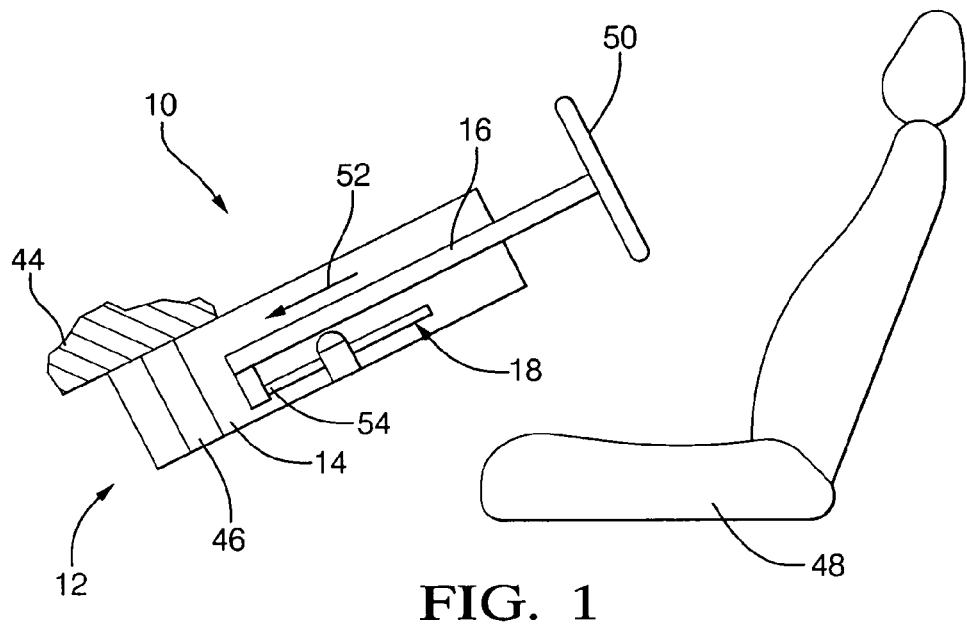
FIG. 1 is a schematic view of a collapsible steering column that includes the exemplary embodiment of the invention.

Referring now to FIG. 1, an energy absorbing device 10 is associated with a collapsible steering column 12 of a vehicle 44. The steering column 12 includes a first steering column member 14 and a second steering column member 16 movable relative to one another in telescoping relation. The first steering column member 14 is fixedly associated with respect to the vehicle 44 with a bracket 46.

In the event of a vehicle crash or impact situation, the first steering column member 14 will decelerate at the same rate as the vehicle 44. A driver of the vehicle 44 may not decelerate at the same rate as the vehicle 44. In such an impact situation, the driver of the vehicle 44 positioned in a seat 48 may be propelled forward against a steering wheel 50 in response to differences between the relative decelerations of the vehicle 44 and the driver.

The steering wheel 50 is connected to the second steering column member 16. In the event of a vehicle crash, the driver may be propelled against the steering wheel 50 and urge both the steering wheel 50 and second steering column member 16 in the direction 52. During movement of the second steering column member 16 in the direction 52, the energy absorbing device 10 substantially absorbs the kinetic energy generated by the movement of the driver against the steering wheel 50 to reduce the likelihood of injury to the driver.

Figure 2:
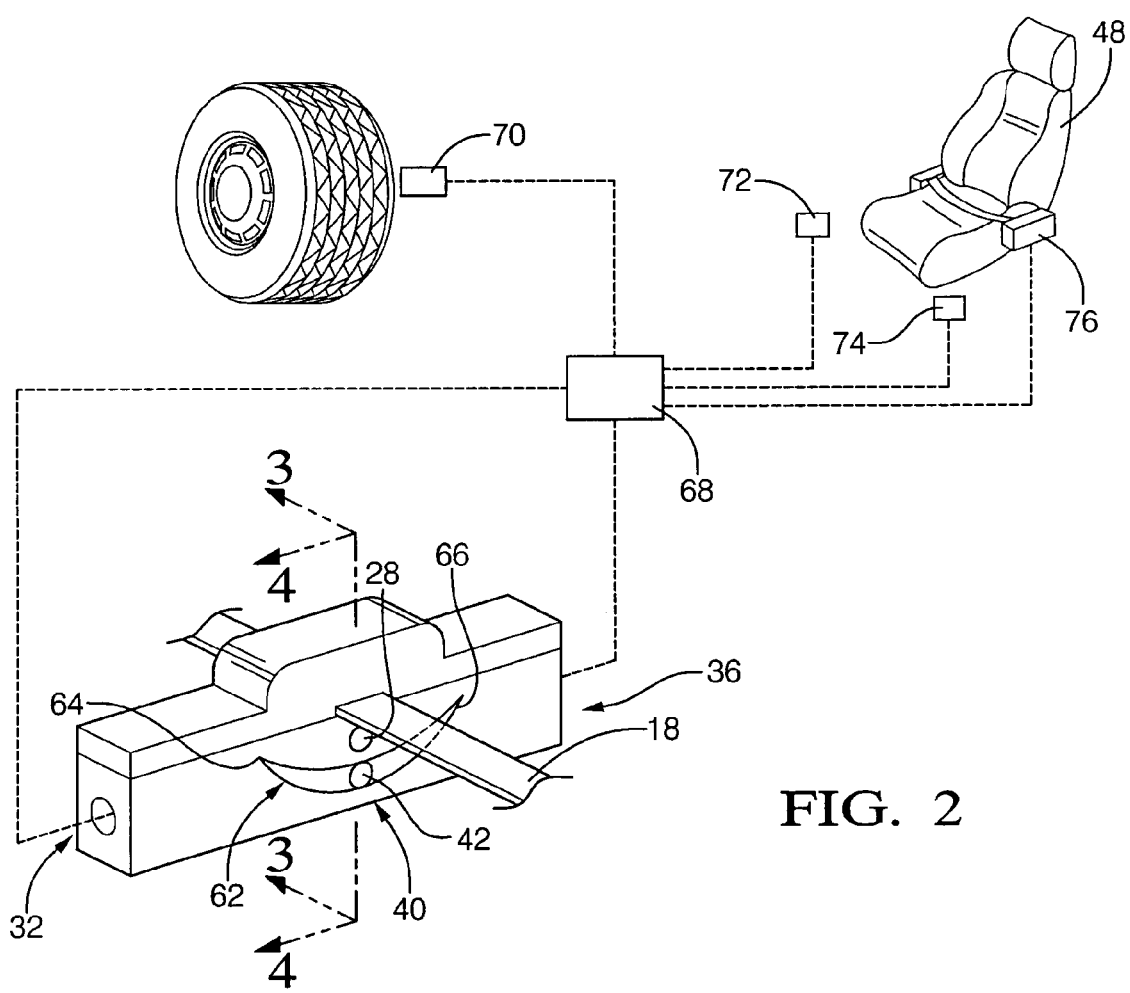
FIG. 2 is a schematic view of a controller of the exemplary energy absorbing device according to the invention.

Referring now to FIGS. 1 and 2, a strap 18 is operably associated with at least one of the first and second steering column members 14, 16. The strap 18 is movable in response to relative movement between the first and second steering column members 14, 16. A first end 54 of the strap 18 is fixedly associated with the second steering column member 16. As the second steering column member 16 moves in telescoping relation with respect to the first steering column member 14, in the direction 52, the strap 18 also moves in the direction 52. The strap 18 is formed from ductile material such as steel or aluminum.

Figure 3:
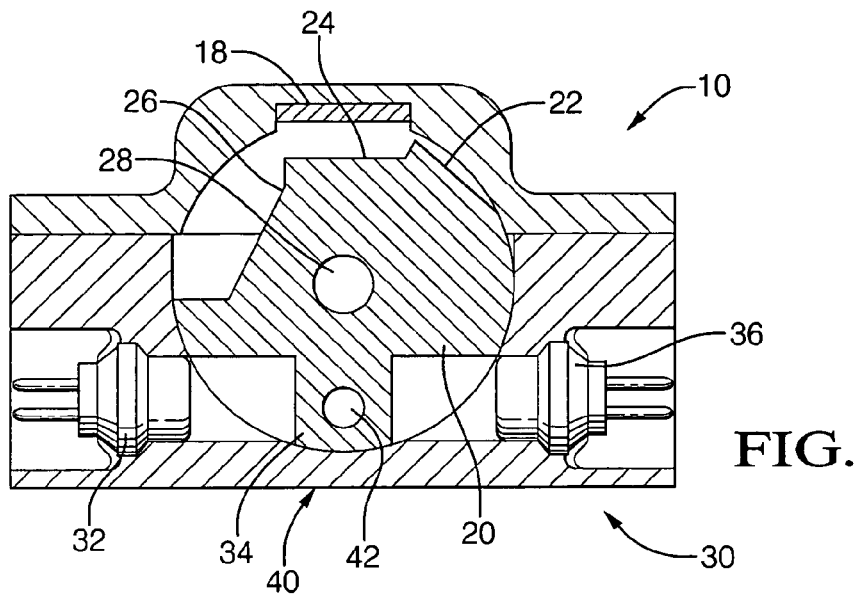
FIG. 3 is a first cross-sectional view taken along section lines 3—3 shown in FIG. 2 and shows an anvil according to the exemplary embodiment of the invention in a first angular position.

Referring now to FIGS. 2 and 3, an anvil 20 variably transmits an amount of energy associated with collapse of a steering column 12 by defining an axis 28 of rotation and a plurality of different bending profiles 22, 24, 26 radially spaced around the axis 28. Each profile 22, 24, 26 corresponds to a different path length. Generally, the greater the path length, the greater the energy absorption. The strap 18 is drawn over one of the profiles 22, 24, 26 during an impact situation. The anvil 20 includes three profiles 22, 24, 26; however, the anvil 20 can have two profiles or have more than three profiles.

The profiles 22, 24, 26 are radially adjacent to one another about an axis 28 of rotation of the anvil 20. The axis 28 is shown extends parallel to the strap 18. However, the axis 28 of rotation of the anvil 20 can extend transverse to the strap 18.

A rotating device 30 rotates the anvil 20 about the axis 28. The rotating device 30 includes first and second explosive charges 32, 36 for rotating the anvil 20. The anvil 20 defines a follower portion 34 spaced from the axis 28. The first and second explosive charges 32, 36 can be disposed on opposite sides of the follower portion 34. A detonation of the charges 32, 36 act against the follower portion 34.

Figure 4:
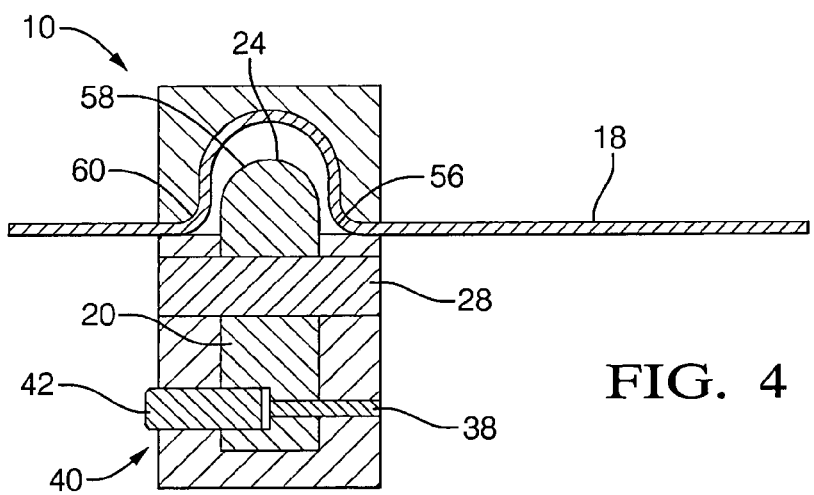
FIG. 4 is a second cross-sectional view taken along section lines 4—4 shown in FIG. 2 and corresponds to the cross-sectional view of FIG. 3, showing the anvil in the first angular position.
Figure 5:
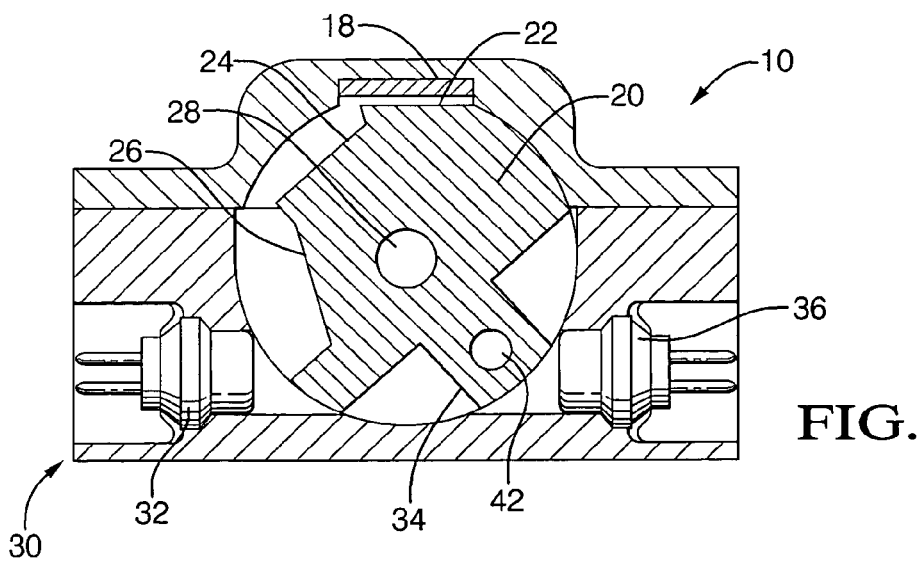
FIG. 5 is a third cross-sectional view taken along similar section lines as FIG. 3 but shows the anvil in a second angular position.
Figure 6:
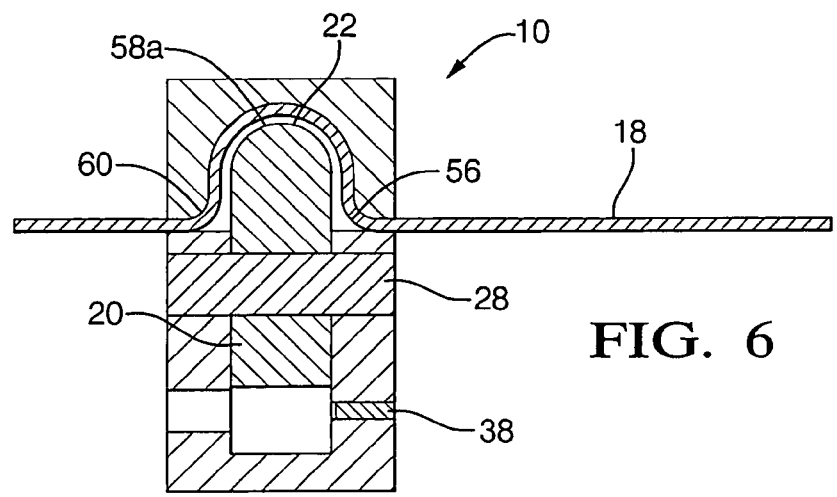
FIG. 6 is a fourth cross-sectional view taken along similar section lines as FIG. 4 but corresponds to the cross-sectional view of FIG. 5, showing the anvil in the second angular position.

FIGS. 3 and 4 show the anvil 20 in a first angular position. The profile 24 is positioned adjacent the strap 18 when the anvil 20 is in the first angular position. The charge 32 can be detonated to rotate the anvil 20 in the counterclockwise direction to the second angular position, as shown in FIGS. 5 and 6. FIG. 5 shows the charge 32 detonated and the anvil 20 rotated such that the profile 22 is adjacent the strap 18. When the anvil 20 is in the second angular position, the strap 18 will follow a longer path of deformation than the path defined by the anvil 20 when the anvil 20 is in the first angular position. For example, as best shown in FIGS. 4 and 6, the strap 18 is plastically deformed around bend points 56, 58 or 58*a*, and 60. When the anvil 20 is in the second angular position (FIG. 6), the bend point 58*a* is spaced further from the bend points 56, 60 when compared to the relative distance between the bend points 58 and 56, 60 when the anvil 20 is in the first angular position (FIG. 4).

Figure 7:
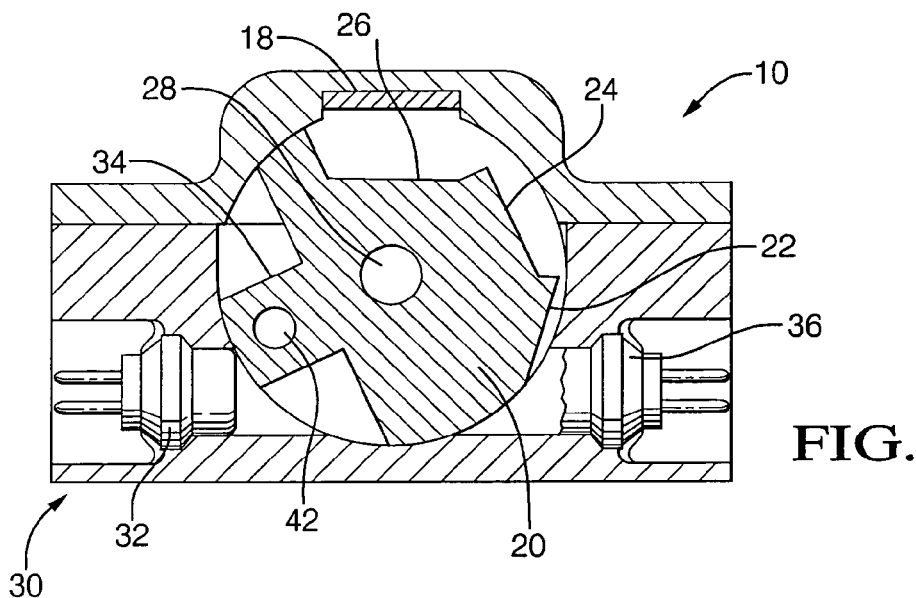
FIG. 7 is a fifth cross-sectional view taken along similar section lines as FIGS. 3 and 5 nut shows the anvil in a third angular position.
Figure 8:
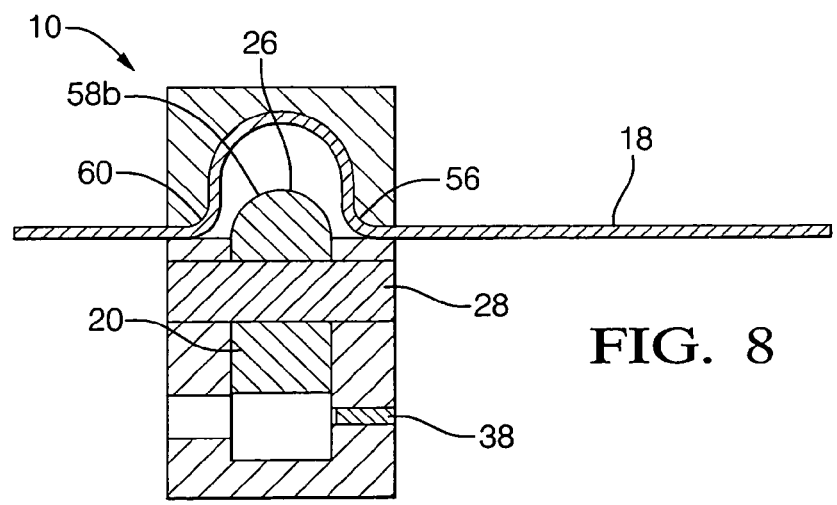
FIG. 8 is a sixth cross-sectional view taken along similar section lines as FIGS. 4 and 6 but corresponds to the cross-sectional view of FIG. 7, showing the anvil in the third angular position.
Figure 9:
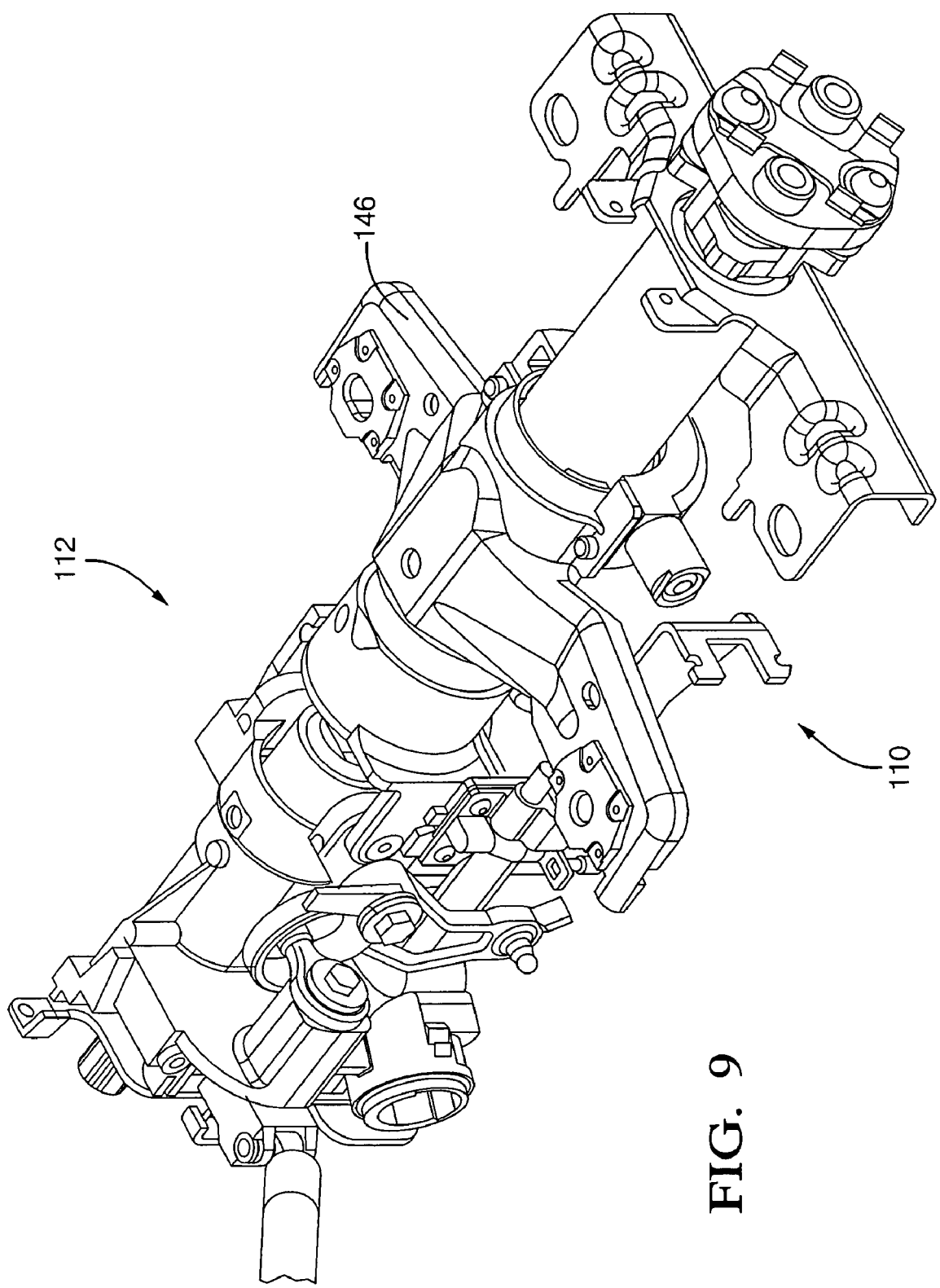
FIG. 9 is a perspective view of a second exemplary embodiment of the invention disposed in a second exemplary steering column.
Figure 10:
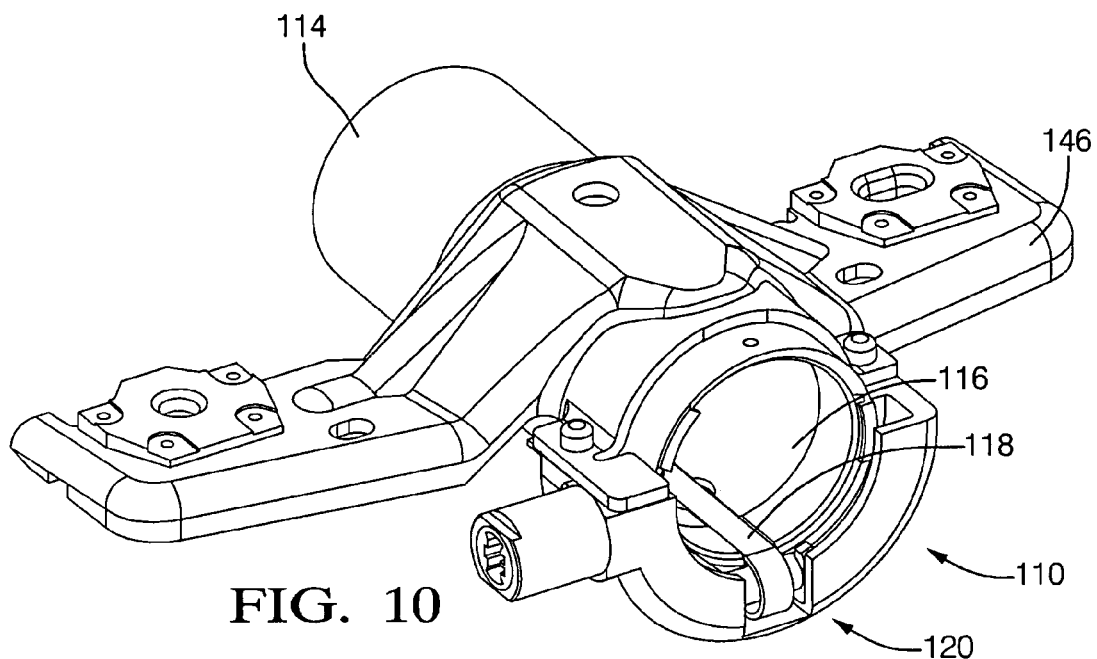
FIG. 10 is a detail perspective view of the second exemplary embodiment.
Figure 11:
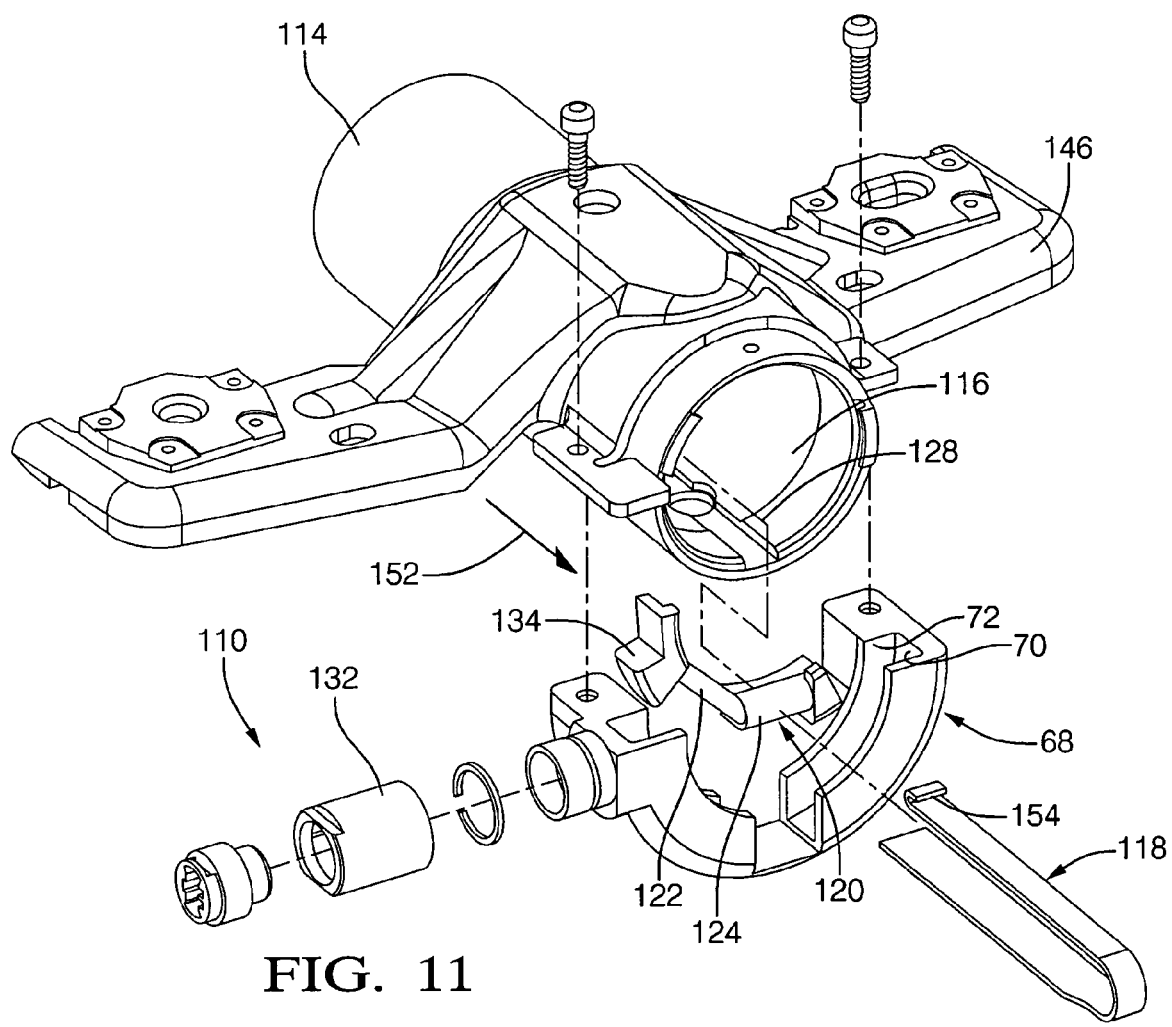
FIG. 11 is an exploded view of the structure shown in FIG. 10.
Figure 12:
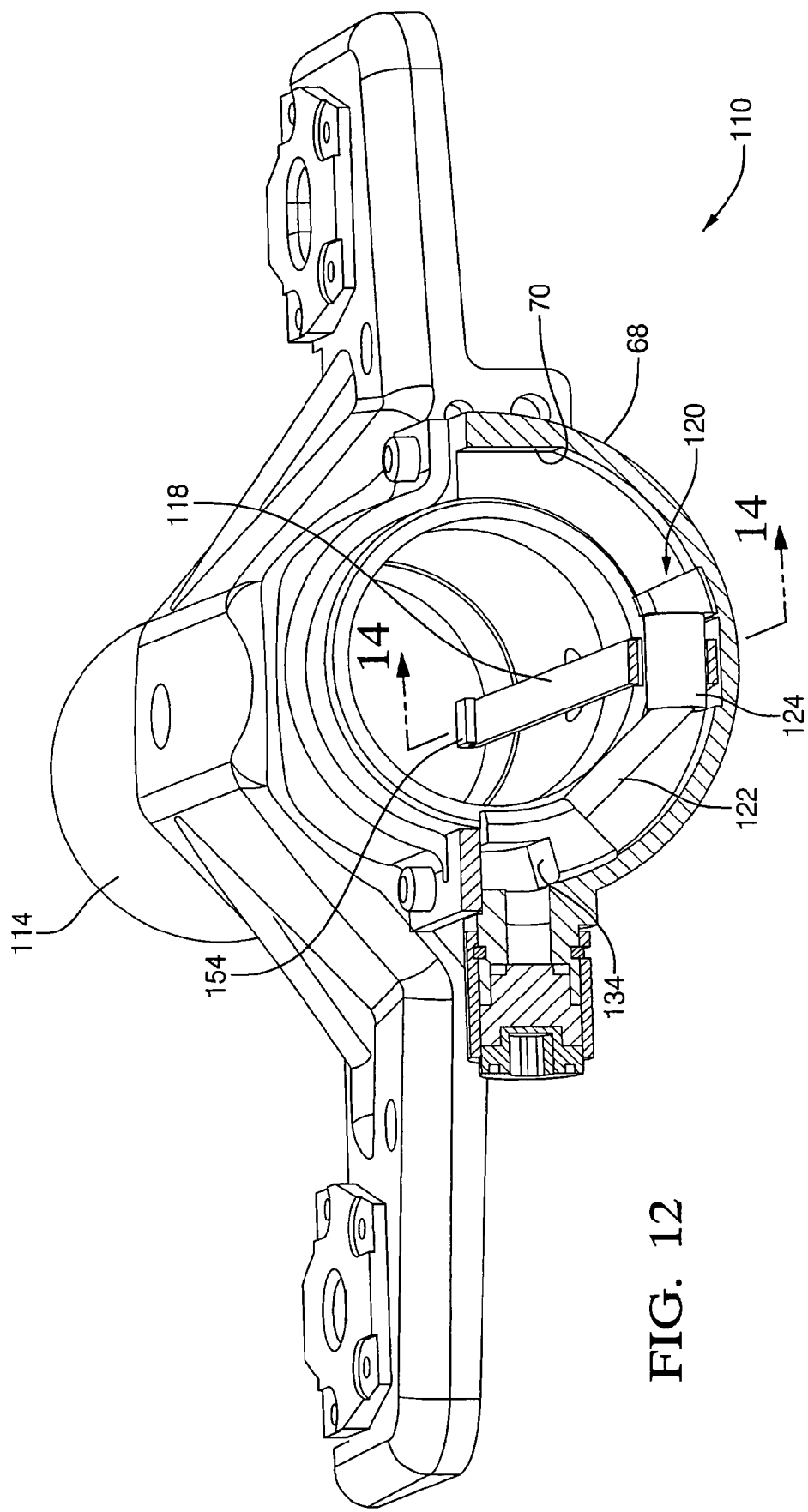
FIG. 12 is a perspective view of the secondary embodiment wherein a strap is deformed around a first profile defined by an anvil.
Figure 13:
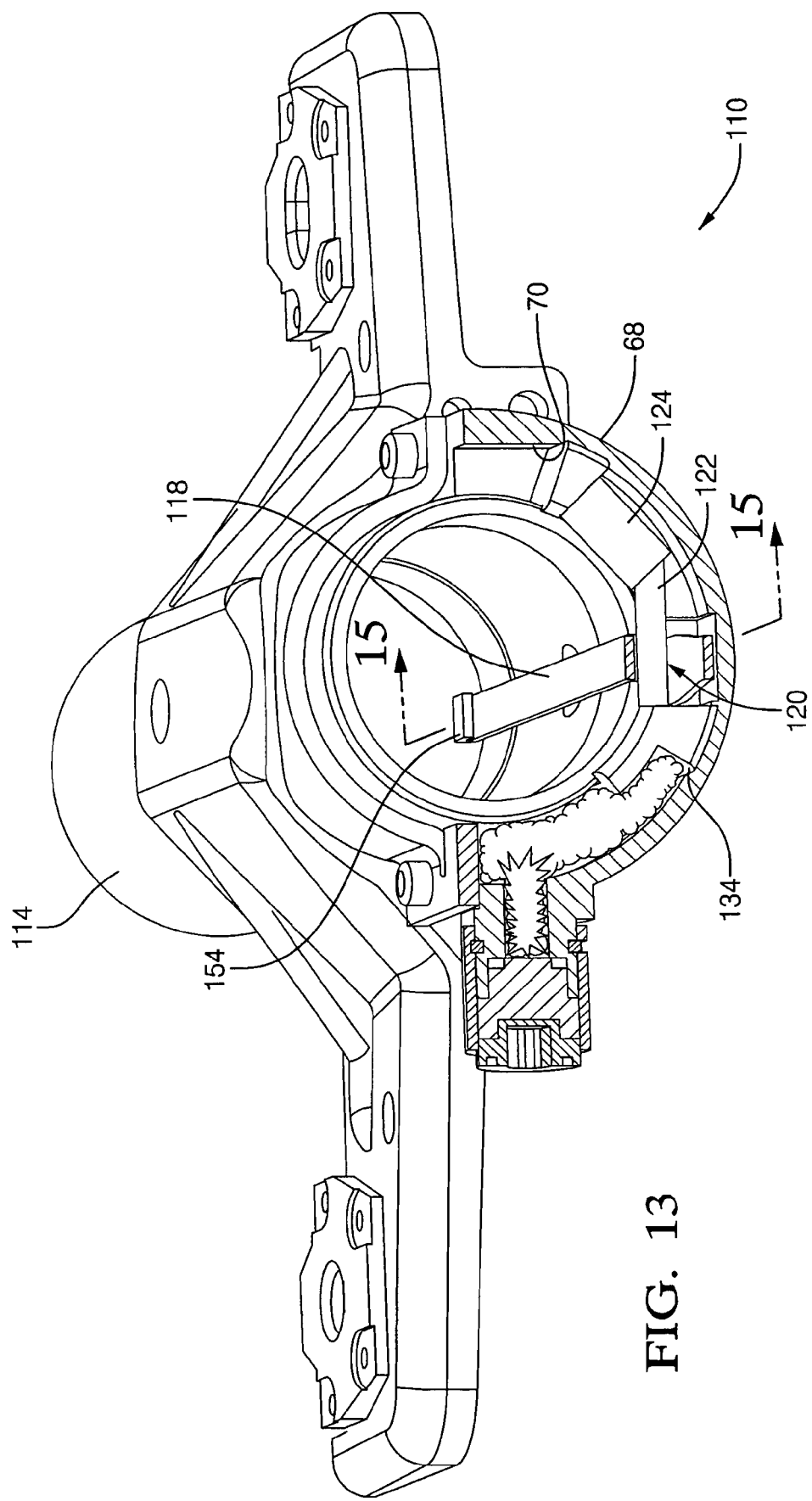
FIG. 13 is a perspective view of the secondary embodiment wherein the strap is deformed around a second profile defined by the anvil.
Figure 14:
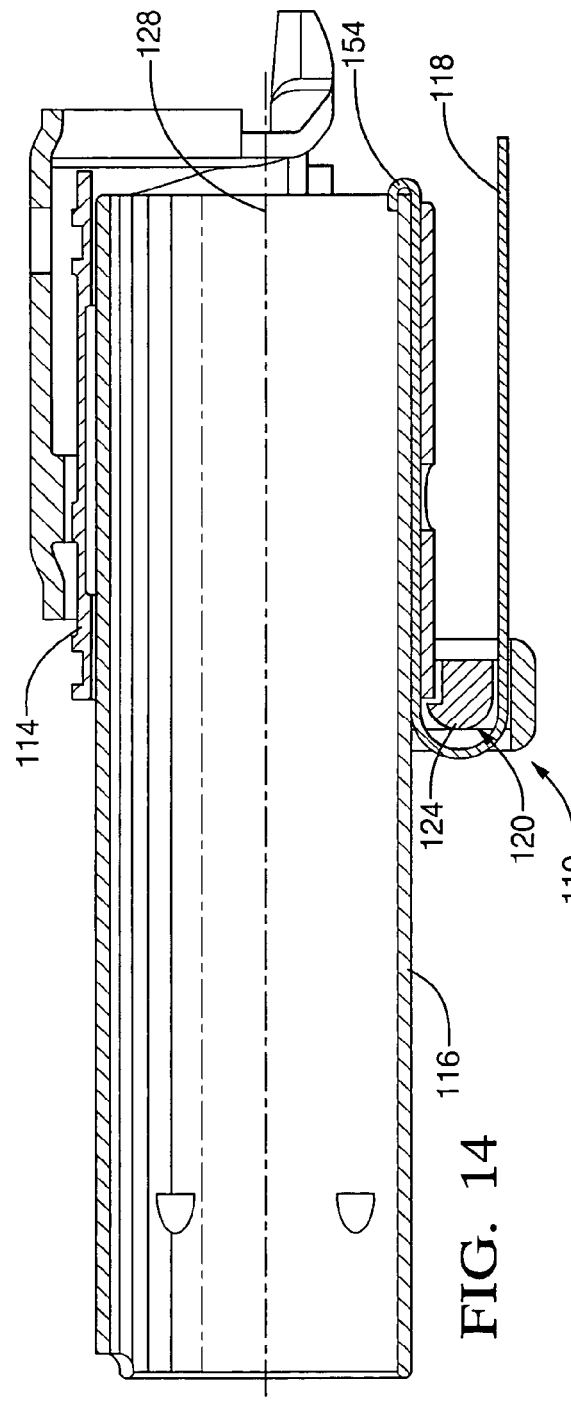
FIG. 14 is a cross-sectional view taken along section lines 14—14 in FIG. 12.
Figure 15:
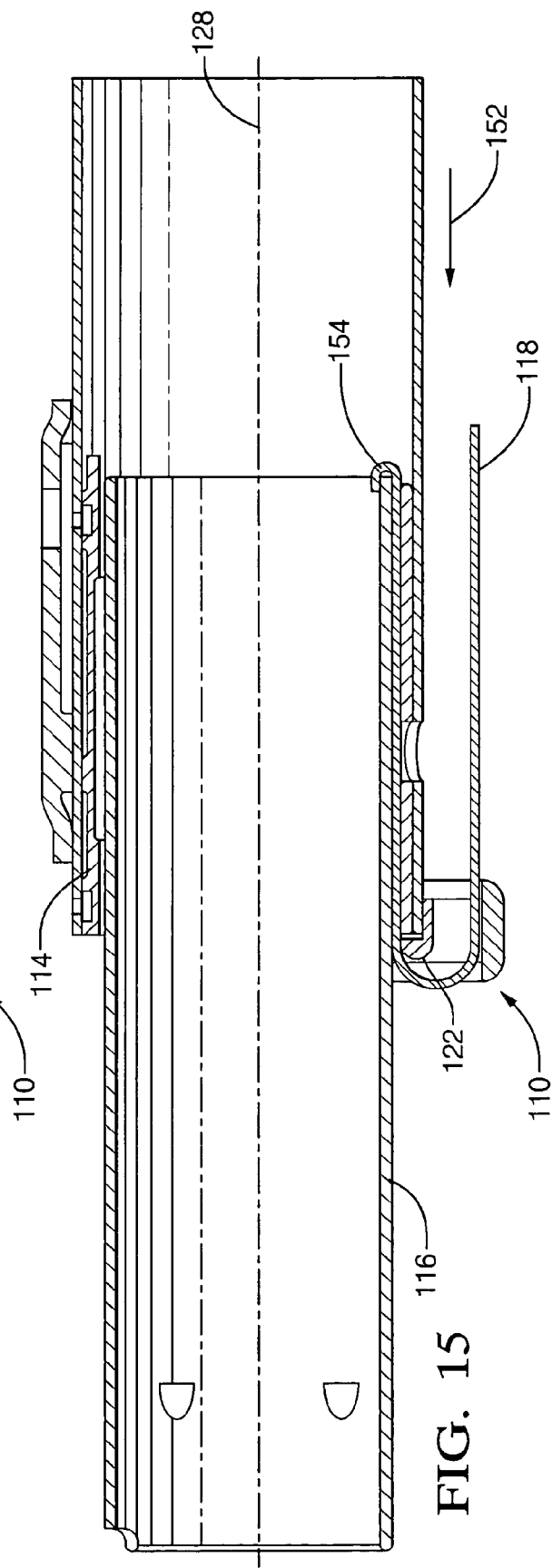
FIG. 15 is a cross-sectional view taken along section lines 15—15 in FIG. 13.

The charge 36 can be detonated to rotate the anvil 20 in the clockwise direction to the third angular position. The profile 26 is adjacent the strap 18 when the anvil 20 is in the third angular position. FIG. 7 shows the charge 36 in a detonated condition and the anvil 20 rotated to a third angular position. When the anvil 20 is in the third angular position, the strap 18 will follow a shorter path of deformation than the path defined by the anvil 20 when the anvil 20 is in the first angular position. For example, as best shown in FIGS. 4 and 8, the strap 18 is plastically deformed around bend points 56, 58 or 58*b*, and 60. When the anvil 20 is in the third angular position (FIG. 8), the bend point 58*b* is spaced further from the bend point 56, 60 when compared to the relative distance between the bend points 58 and 56, 60 when the anvil 20 is in the first angular position (FIG. 4). For clarity, the strap 18 is shown in the drawing figures in the presently preferred pre-collision configuration.

Referring now to FIG. 4, a shear pin 38 maintains the anvil 20 in the desired position prior to the detonation of one of the explosive charges 32, 36. The presently preferred position is the first angular position corresponding to the intermediate path length of deformation. The pin 38 is broken in response to the detonation of one of the charges 32, 36.

Referring now to FIGS. 1–3, a braking device 40 stops the anvil 20 in a desired position after one of the explosive charges 32, 36 has been detonated. The braking device 40 includes a pin 42 extending from the anvil 20. The pin 42 is positioned in a slot 62 having tapered ends 64, 66. The slot 62 can be sized slightly larger than the diameter of the pin 42 at a position corresponding to the first angular position of the anvil 20, as shown in FIG. 2. The diameter of the slot 62 can taper at the ends 64, 66 to increase the likelihood that the pin 42 will become wedged in the slot 62 when the anvil is moved to one of the second and third angular positions.

The rotation of the anvil 20 is controlled by a controller 68. The controller 68 communicates with a plurality of sensors 70, 72, 74, 76 and with charges 32, 36 to selectively rotate the anvil 20. The sensor 70 is a vehicle speed sensor, the sensor 72 is driver-to-steering wheel proximity sensor, the sensor 74 is a driver-weight sensor, and the sensor 76 is a seat belt engagement sensor. Each of the conditions sensed by the sensors 70, 72, 74, 76 can effect the energy associated with the driver of the vehicle 44 being propelled against the steering wheel 50.

For example, greater vehicle speed generally corresponds to greater energy. If the vehicle 44 is traveling at a high rate of speed, the driver may be propelled with greater force against the steering wheel 50 than in a low-speed impact situation. In response to greater vehicle speed in an impact situation, the controller 68 can detonate the charge 32 to move the profile 22 adjacent the strap 18 and absorb more energy.

In addition, the closer the driver of the vehicle 44 is to the steering wheel 50, the greater the likely force that the driver will exert on the steering wheel 50. In response to the driver being positioned relatively close to the steering wheel 50, the controller 68 can detonate the charge 32 to move the profile 22 adjacent the strap 18 and absorb more energy. Also, the greater the weight of the driver, the greater the likely force that the driver will exert on the steering wheel 50. In response to greater driver weight, the controller 68 can detonate the charge 32 to move the profile 22 adjacent the strap 18 and absorb more energy. Also, the driver is likely to exert greater force on the steering wheel 50 in an impact situation if the driver is not wearing a seat belt. In response to disengagement of the driver's seat belt in an impact situation, the controller 68 can detonate the charge 32 to move the profile 22 adjacent the strap 18 and absorb more energy.

Referring to FIGS. 9–15, in a first exemplary embodiment of the invention, the invention provides an energy absorbing device 110 for a collapsible steering column 112 of a vehicle. The steering column 112 includes a first steering column member 114 and a second steering column member 116 movable relative to one another in telescoping relation. The first steering column member 114 is releasably associated with respect to the vehicle with a bracket 146.

The invention includes a strap 118 operably associated with at least one of the first and second steering column members 114, 116. The strap 118 is movable in response to relative movement between the first and second steering column members 114, 116. In the first exemplary embodiment of the invention, a first end 154 of the strap 118 is fixedly associated with the second steering column member 116. The strap 118 is formed from ductile material such as steel or aluminum.

The invention also includes an anvil 120 for variably transmitting an amount of energy associated with collapse of the steering column 112 by being moveable with respect to an axis 128 and having a plurality of different bending profiles 122, 124 radially spaced around the axis 128. The anvil 120 is spaced from the axis 128 and translates or rotates relative to the axis 128. The axis 128 can be the centerline of the steering column 112. In the first exemplary embodiment of the invention, the anvil 120 is rotatable about the axis 128 which corresponds to the centerline of the steering column 112.

As the first steering column member 114 moves in telescoping relation with respect to the second steering column member 116, in a direction 152, the anvil 120 is moved in the direction 152 by the first steering column member 114 to draw the strap 118 over one of the bending profiles 122, 124 of the anvil 120. The strap 118 is drawn over one of the profiles 122, 124 during an impact situation. Each profile 122, 124 corresponds to a different rate of energy absorption or, in other words, a different rate of deformation of the strap. Generally, the greater the radius of the bending profile 122, 124, the lesser the energy absorption. For example, the rate of energy absorption associated with drawing the strap 118 over the bending profile 122 is greater than the rate of energy absorption associated with drawing the strap 118 over the bending profile 124.

The profiles 122, 124 are radially adjacent to one another relative to, the axis 128. The axis 128 is shown in the first exemplary embodiment of the invention extending parallel to the strap 118. However, the invention can be practiced wherein the axis 128 of rotation of the anvil 120 extends transverse to the strap 118. Also, the anvil 120 is shown as being generally arcuate and centered on the axis 128. However, in alternative embodiments of the invention, the anvil 120 could be straight and move or translate linearly in a direction transverse to the axis 128.

The invention also includes a moving device 130 for moving the anvil 120 relative to the axis 128. In the first exemplary embodiment of the invention, the moving device 130 rotates the anvil 120 about the axis 128 and includes a housing 68 defining an angular slot 70. The anvil 120 is movably positioned in the slot 70. The anvil 120 is movable in the slot 70 between a first position shown in FIGS. 11, 12 and 14, to a second position shown in FIGS. 13 and 15. The strap 118 is drawn over the bending profile 124 when the anvil 120 is in the first position and is drawn over the bending profile 122 when the anvil 120 is in the second position. In alternative embodiments of the invention, the slot 70 could be channel-like to guide the anvil 120 in linear movement.

The moving device 130 also includes a first explosive charge 132 for moving the anvil 120. The anvil 120 defines a follower portion 134 spaced from the axis 128. The first explosive charge 132 is disposed adjacent to the follower portion 134. When the charge 132 detonates, the explosion acts against the follower portion 134 and urges the anvil 120 from the first position to the second position. As result, strap 118 will be drawn over the bending profile 122 and the rate of energy absorption of the energy absorbing device 110 increases. The slot 70 defines a tapered end portion 72 that engages the anvil 120 after the explosion of the charge 132 to increase the likelihood that the bending profile 122 is flush with the strap 118.

Figure 16:
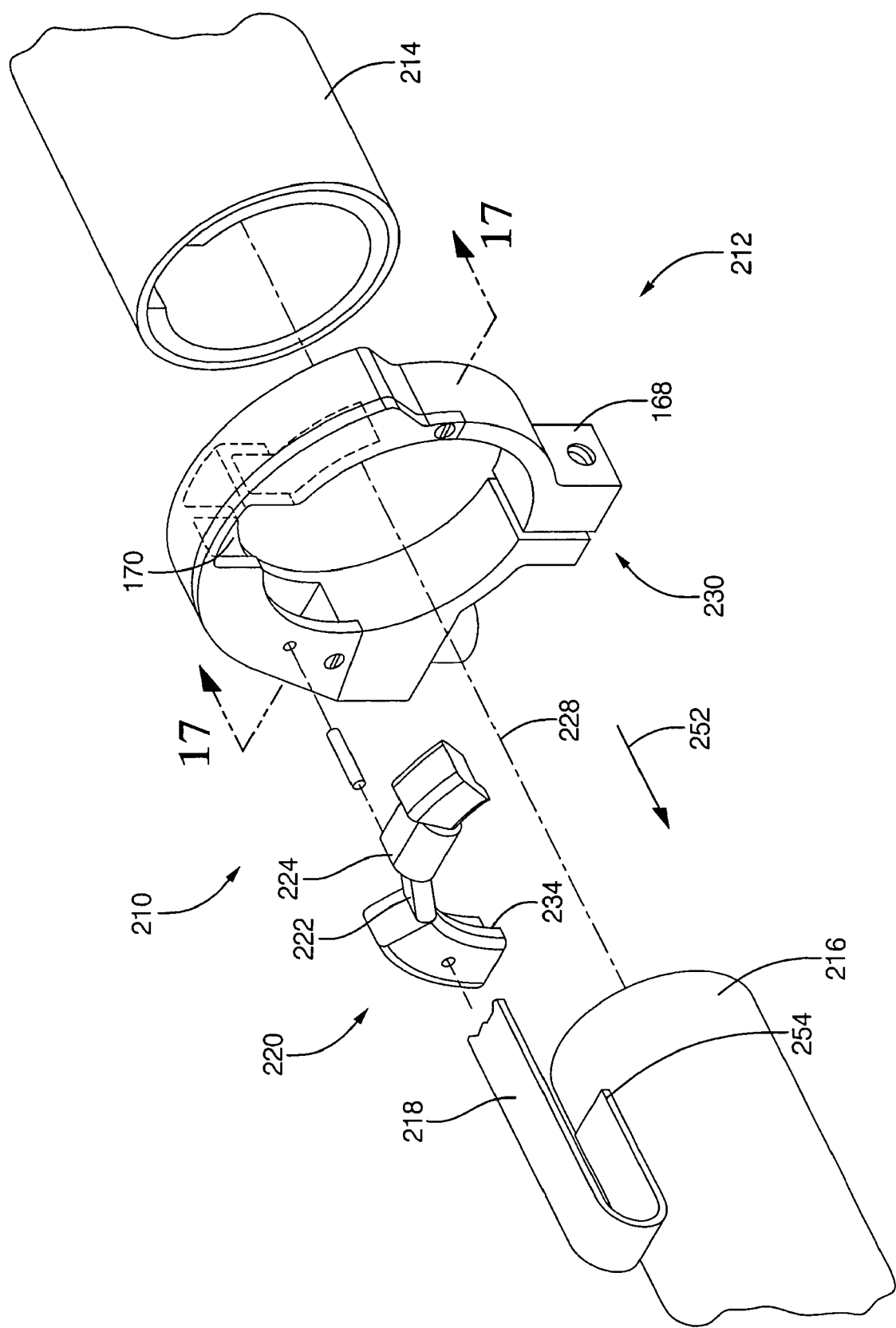
FIG. 16 is an exploded view of a third exemplary embodiment of the invention.
Figure 18:
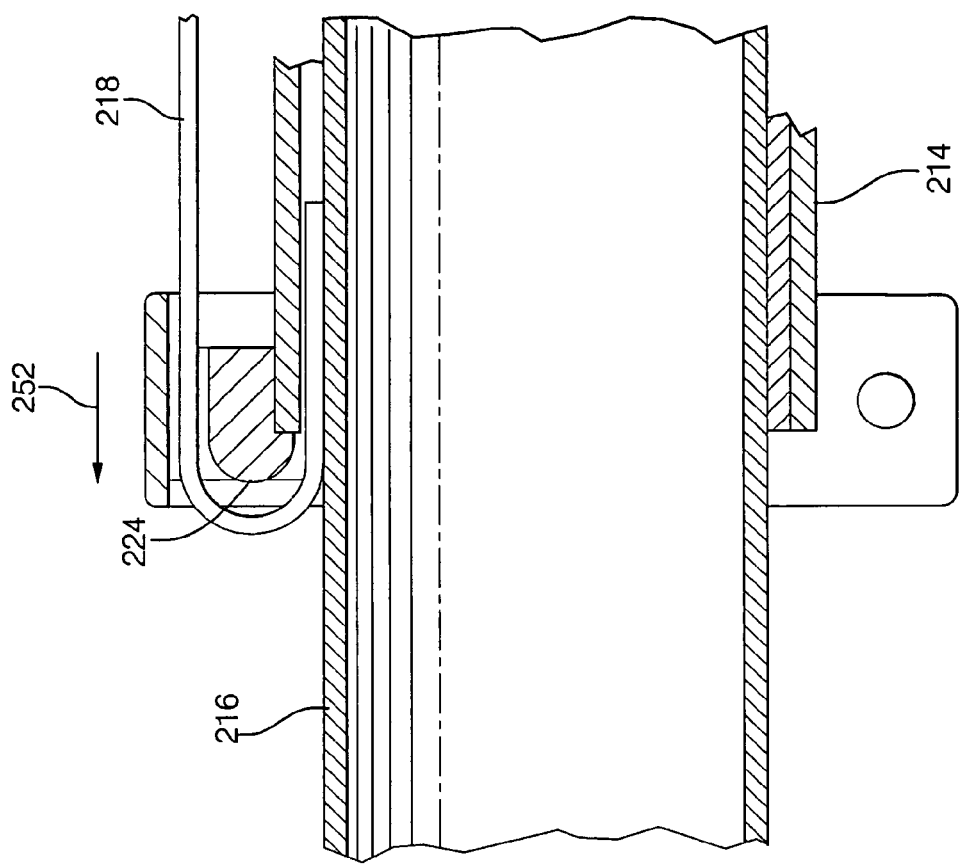
FIG. 18 is a cross-sectional view taken along lines 18—18 in FIG. 17.
Figure 17:
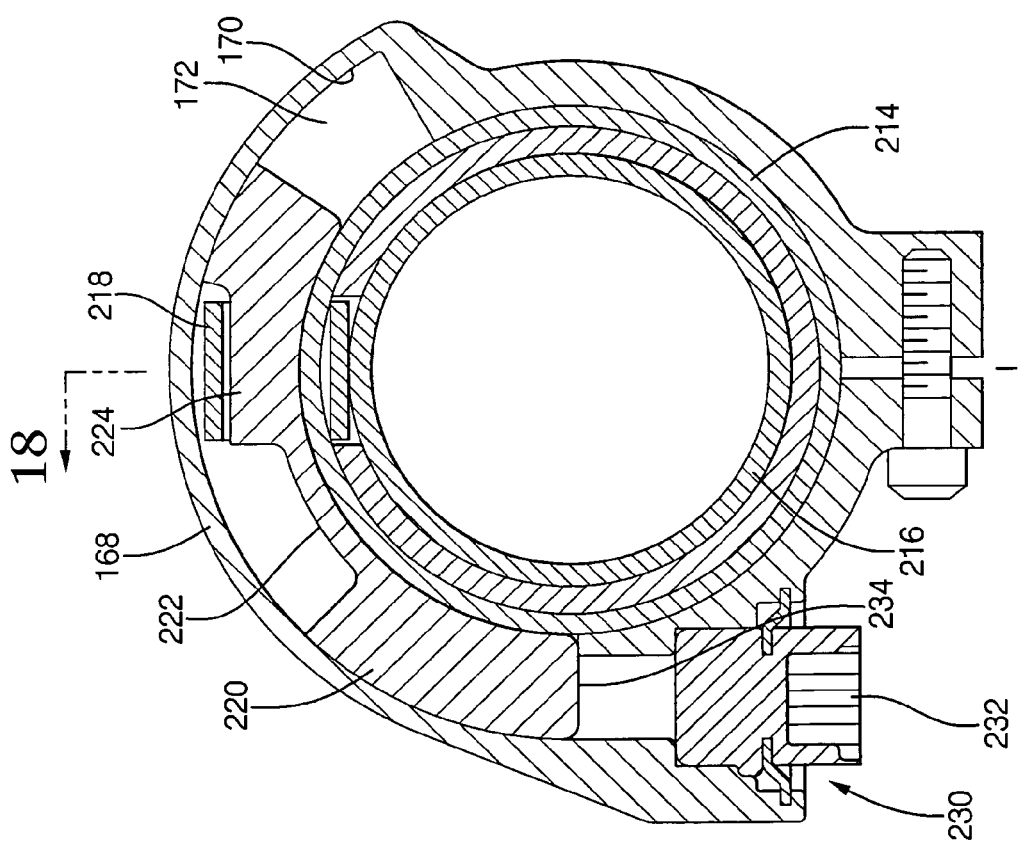
FIG. 17 is a cross-sectional view taken along section lines 17—17 in FIG. 16.
Figure 19:
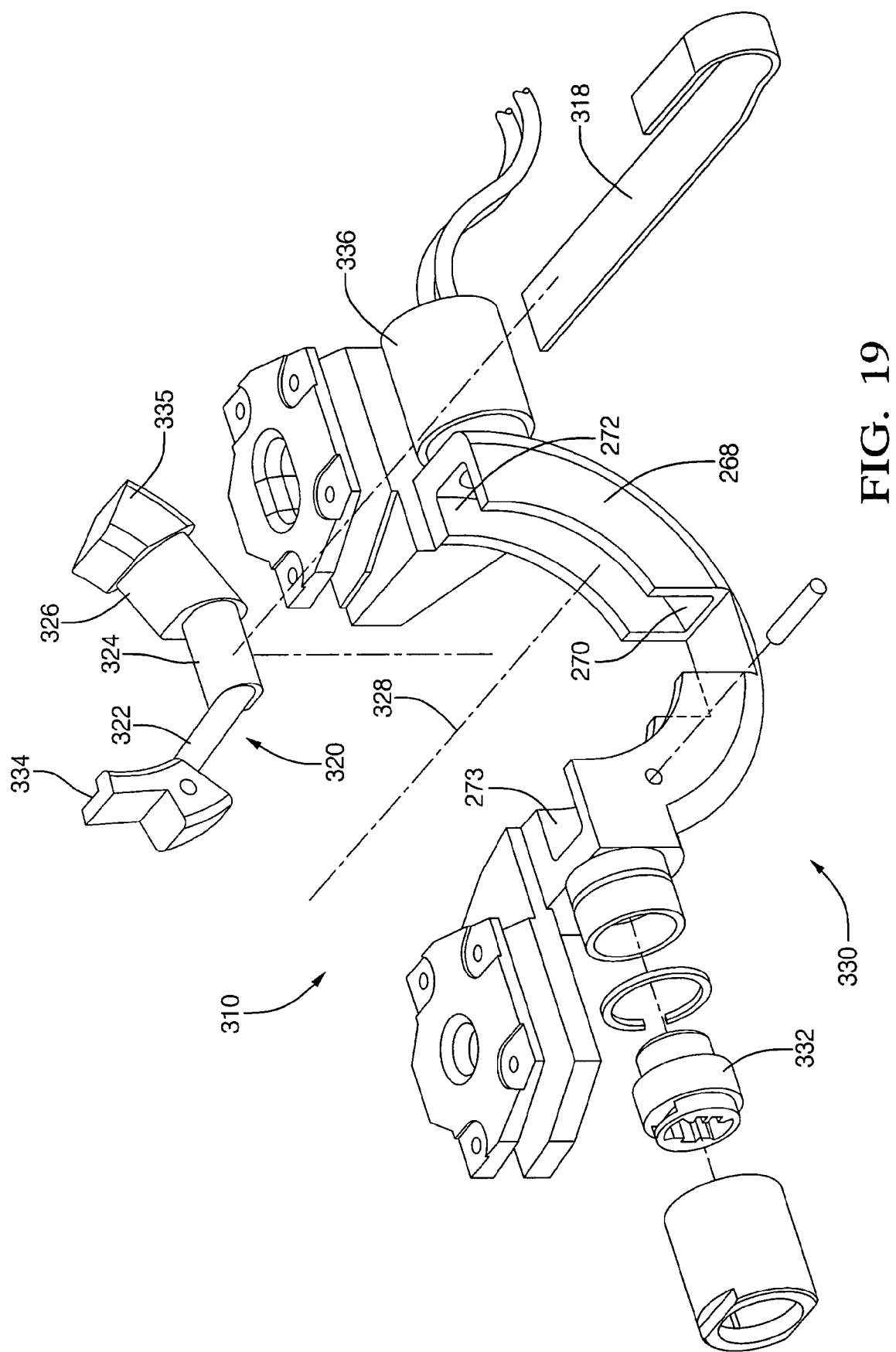
FIG. 19 is an exploded view of a fourth exemplary embodiment of the invention.

Referring to FIGS. 16–18, in a second exemplary embodiment of the invention, the invention provides an energy absorbing device 210 for a collapsible steering column 212 of a vehicle. The steering column 212 includes a first steering column member 214 and a second steering column member 216 movable relative to one another in telescoping relation. A strap 218 is operably associated with at least one of the first and second steering column members 214, 216. The strap 218 is movable in response to relative movement between the first and second steering column members 214, 216. In the second exemplary embodiment of the invention, a first end 254 of the strap 218 is fixedly associated with the second steering column member 216. The strap 218 is formed from ductile material such as steel or aluminum.

The invention also includes an anvil 220 for variably transmitting an amount of energy associated with collapse of a steering column 212 by being moveable relative to an axis 228 and having a plurality of different bending profiles 222, 224 radially spaced with respect to the axis 228. The anvil 220 is spaced from the axis 228. As the first steering column member 214 moves in telescoping relation with respect to the second steering column member 216, in a direction 252, the anvil 220 is moved in the direction 252 by the first steering column member 214 to draw the strap 218 over one of the bending profiles 222, 224 of the anvil 220. The strap 218 is drawn over one of the profiles 222, 224 during an impact situation. Each profile 222, 224 corresponds to a different rate of energy absorption. Generally, the greater the radius of the bending profile 222, 224, the lesser the energy absorption. For example, the rate of energy absorption associated with drawing the strap 218 over the bending profile 222 is greater than the rate of energy absorption associated with drawing the strap 218 over the bending profile 224.

The profiles 222, 224 are radially adjacent to one another with respect to the axis 228. The axis 228 is shown in the exemplary embodiment of the invention extending parallel to the strap 218. However, the invention can be practiced wherein the axis 228 extends transverse to the strap 218.

The invention also includes a moving device 230 for moving the anvil 220 relative to the axis 228. In the second exemplary embodiment of the invention, the moving device 230 includes a housing 168 defining an angular slot 170. The anvil 220 is movably positioned in the slot 170. The anvil 220 is movable in the slot 170 between a first position wherein the bending profile 224 engages the strap 218, as shown in FIGS. 16 and 17, to a second position wherein the bending profile 222 engages the strap 218. The strap 218 is drawn over the bending profile 224 when the anvil 220 is in the first position and is drawn over the bending profile 222 when the anvil 220 is in the second position.

The moving device 230 also includes a first explosive charge 232 for moving the anvil 220. The anvil 220 defines a follower portion 234 spaced from the axis 228. The first explosive charge 232 is disposed adjacent to the follower portion 234. When the charge 232 detonates, the explosion acts against the follower portion 234 and urges the anvil 220 from the first position to the second position. As result, strap 218 will be drawn over the bending profile 222 and the rate of energy absorption of the energy absorbing device 210 increases. The slot 170 defines a tapered end portion 172 that engages the anvil 220 after the explosion of the charge 232 to increase the likelihood that the bending profile 222 is flush with the strap 218.

Referring to FIGS. 19–22, in a third exemplary embodiment of the invention, the invention provides an energy absorbing device 310 for a collapsible steering column 312 of a vehicle. The steering column 312 includes a first steering column member 314 and a second steering column member 316 movable relative to one another in telescoping relation. A strap 318 is operably associated with at least one of the first and second steering column members 314, 316. The strap 318 is movable in response to relative movement between the first and second steering column members 314, 316. In the exemplary embodiment of the invention, a first end 354 of the strap 318 is fixedly associated with the second steering column member 316. The strap 318 is formed from ductile material such as steel or aluminum.

The invention also includes an anvil 320 for variably transmitting an amount of energy associated with collapse of a steering column 312 by being movable with respect to an axis 328 and having a plurality of different bending profiles 322, 324, 326 radially spaced with respect to the axis 328. The anvil 320 is spaced from the axis 328. As the first steering column member 314 moves in telescoping relation with respect to the second steering column member 316, in a direction 352, the anvil 320 moved by the first steering column member 314 to draw the strap 318 over one of the bending profiles 322, 324, 326 of the anvil 320. The strap 318 is drawn over one of the profiles 322, 324, 326 during an impact situation. Each profile 322, 324, 326 corresponds to a different rate of energy absorption. Generally, the greater the radius of the bending profile 222, 224, the lesser the energy absorption. For example, the rate of energy absorption associated with drawing the strap 318 over the bending profile 322 is greater than the rate of energy absorption associated with drawing the strap 318 over the bending profile 326.

The profiles 322, 324, 326 are radially adjacent to one another with respect to the axis 328. The axis 328 is shown in the exemplary embodiment of the invention extending parallel to the strap 318. However, the invention can be practiced wherein the axis 328 extends transverse to the strap 318.

Figure 20:
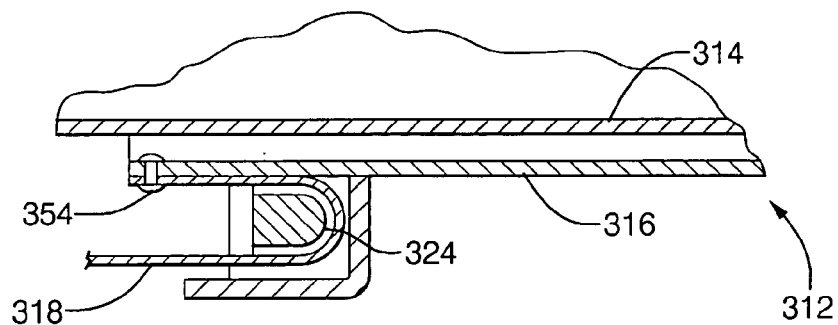
FIG. 20 is a cross-sectional view analogous to the cross-sectional views of FIGS. 15–16 and corresponding to the fourth exemplary embodiment wherein a strap is deformed around a first profile defined by an anvil.
Figure 21:
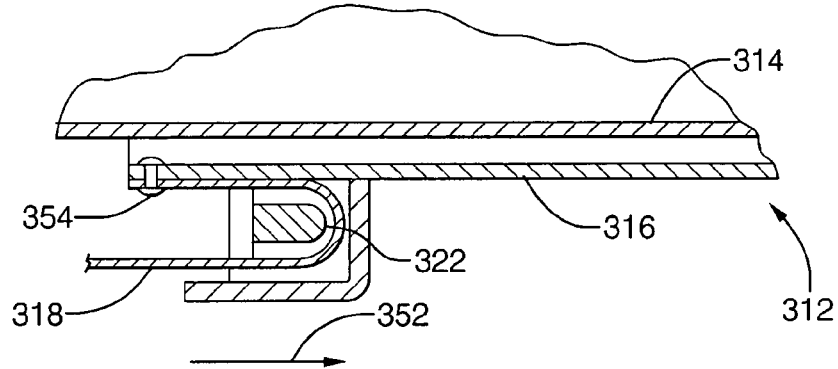
FIG. 21 is a cross-sectional view analogous to the cross-sectional views of FIGS. 15–16, 21 and corresponding to the fourth exemplary embodiment wherein the strap is deformed around a second profile defined by the anvil.
Figure 22:
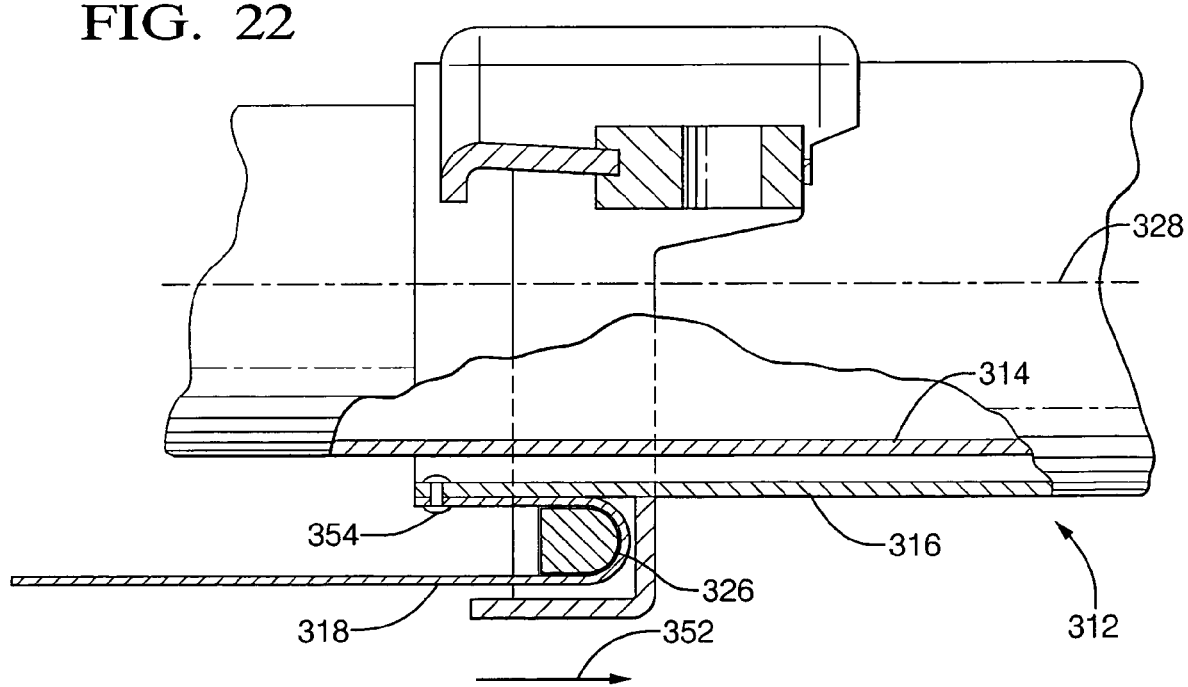
FIG. 22 is a cross-sectional view analogous to the cross-sectional views of FIGS. 15–16, 21–22 and corresponding to the fourth exemplary embodiment wherein the strap is deformed around a third profile defined by the anvil.

The invention also includes a moving device 330 for moving the anvil 320 relative to the axis 328. In the third exemplary embodiment of the invention, the moving device 330 includes a housing 268 defining an angular slot 270. The anvil 320 is movably positioned in the slot 270. The anvil 320 is movable in a first angular direction in the slot 170 between a first position wherein the bending profile 324 engages the strap 318, as shown in FIG. 20, to a second position wherein the bending profile 322 engages the strap 318, as shown in FIG. 21. The strap 318 is drawn over the bending profile 324 when the anvil 320 is in the first position and is drawn over the bending profile 322 when the anvil 320 is in the second position. The anvil 320 is also movable in a second angular direction in the slot 170 between the first position to a third position wherein the bending profile 326 engages the strap 318. The strap 318 is drawn over the bending profile 326 when the anvil 320 is in the third position, as shown in FIG. 22.

The moving device 330 also includes first and second explosive charges 332, 336 for moving the anvil 320. The anvil 320 defines first and second follower portions 334, 335 spaced from the axis 328. The first explosive charge 332 is disposed adjacent to the first follower portion 334. When the charge 332 detonates, the explosion acts against the follower portion 334 and urges the anvil 320 from the first position to the second position. As result, strap 318 will be drawn over the bending profile 322 and the rate of energy absorption of the energy absorbing device 310 increases. When the charge 336 detonates, the explosion acts against the follower portion 335 and urges the anvil 320 from the first position to the third position. As result, strap 318 will be drawn over the bending profile 326 and the rate of energy absorption of the energy absorbing device 310 decreases. The slot 270 defines first and second tapered end portions 272, 273 that engage the anvil 320 after the explosion of the charge 332, 336, respectively, to increase the likelihood anvil 320 moves to a desired position in the slot 170 and stops moving.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for absorbing energy in a collapsible steering column of a vehicle in response to an excessive frontal impacting force to the steering column so that injury to the vehicle operator is reduced comprising:
    an anvil for variably transmitting an amount of energy associated with collapse of a steering column by being movable with respect to a spaced axis and having a plurality of different bending profiles radially spaced with respect to said axis, wherein said plurality of different bending profiles includes at least one area defining a planar notch portion formed in an exterior surface of said anvil;
    a strap for absorbing energy transmitted by said anvil by being deformable during sliding movement across one of said profiles; and
    a moving device for adjusting an amount of energy absorbed by said strap by moving said anvil with respect to said axis to selectively position one of said bending profiles adjacent to said strap to adjust a rate of deformation of said strap.

2. The apparatus of claim 1 wherein said anvil is further defined as including a follower portion engageable with said moving device during movement of said anvil.

3. The apparatus of claim 2 wherein the moving device is further defined as including an explosive charge.

4. The apparatus of claim 3 wherein said explosive charge is further defined as including first and second explosive charges, and wherein said follower portion is further defined as including first and second follower portions, and wherein said first explosive charge being adjacent to said first follower portion and said second explosive charge being adjacent to said second follower portion, and wherein said anvil being movable in a first direction in response to an explosion of said first explosive charge and movable in a second direction in response to an explosion of said second explosive charge.

5. The apparatus of claim 1 wherein said axis is further defined as extending parallel to said strap.

6. The apparatus of claim 1 wherein said moving device includes a housing defining a slot and said anvil being movably positioned in said slot.

7. The apparatus of claim 6 wherein said slot is further defined as being angular.

8. The apparatus of claim 1 wherein said anvil is further defined as being rotatable about said axis.

9. An apparatus for absorbing energy in a collapsible steering column of a vehicle in response to an excessive frontal impacting force to the steering column so that injury to the vehicle operator is reduced comprising:

an anvil for variably transmitting an amount of energy associated with collapse of a steering column by being movable with respect to a spaced axis and having a plurality of different bending profiles radially spaced with respect to said axis;

a strap far absorbing energy transmitted by said anvil by being deformable during sliding movement across one of said profiles; and a moving device for adjusting an amount of energy absorbed by said strap by moving said anvil with respect to said axis to selectively position one of said bending profiles adjacent to said strap to adjust a rate of deformation of said strap;

wherein said anvil is further defined as including a follower portion engageable with said moving device during movement of said anvil;

wherein the moving device is further defined as including an explosive charge;

wherein said explosive charge is further defined as including first and second explosive charges, and wherein said follower portion is further defined as including first and second follower portions, and wherein said first explosive charge being adjacent to said first follower portion and said second explosive charge being adjacent to said second follower portion, and wherein said anvil being movable in a first direction in response to an explosion of said first explosive charge and movable in a second direction in response to an explosion of said second explosive charge.

10. The apparatus of claim 9 wherein said axis is further defined as extending parallel to said strap.

11. The apparatus of claim 9 wherein said moving device includes a housing defining a slot and said anvil being movably positioned in said slot.

12. The apparatus of claim 11 wherein said slot is further defined as being angular.

13. The apparatus of claim 9 wherein said anvil is further defined as being rotatable about said axis.

14. An apparatus for absorbing energy in a collapsible steering column of a vehicle in response to an excessive frontal impacting force to the steering column so that injury to the vehicle operator is reduced comprising:

an anvil for variably transmitting an amount of energy associated with collapse of a steering column by being movable with respect to a spaced axis and having a plurality of different bending profiles radially spaced with respect to said axis;

a strap for absorbing energy transmitted by said anvil by being deformable during sliding movement across one of said profiles; and a moving device for adjusting an amount of energy absorbed by said strap by moving said anvil with respect to said axis to selectively position one of said bending profiles adjacent to said strap to adjust a rate of deformation of said strap;

wherein said moving device includes a housing defining a slot and said anvil being movably positioned in said slot.

15. The apparatus of claim 14 wherein said anvil is further defined as including a follower portion engageable with said moving device during movement of said anvil.

16. The apparatus of claim 15 wherein the moving device is further defined as including an explosive charge.

17. The apparatus of claim 16 wherein said explosive charge is further defined as including first and second explosive charges, and wherein said follower portion is further defined as including first and second follower portions, and wherein said first explosive charge being adjacent to said first follower portion and said second explosive charge being adjacent to said second follower portion, and wherein said anvil being movable in a first direction in response to an explosion of said first explosive charge and movable in a second direction in response to an explosion of said second explosive charge.

18. The apparatus of claim 14 wherein said axis is further defined as extending parallel to said strap.

19. The apparatus of claim 14 wherein said slot is further defined as being angular.

20. The apparatus of claim 14 wherein said anvil is further defined as being rotatable about said axis.

* * * * *